(12) United States Patent  (10) Patent No.: US 8,520,145 B2
Wang  (45) Date of Patent: Aug. 27, 2013

(54) METHOD AND APPARATUS FOR DISPLAYING VIDEO IMAGE

(71) Applicant: Huawei Device Co.,Ltd., Shenzhen (CN)

(72) Inventor: Pulin Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/707,223

(22) Filed: Dec. 6, 2012

(65) Prior Publication Data

US 2013/0093955 A1  Apr. 18, 2013

Related U.S. Application Data

(63) Continuation of application No. PCT/CN2012/073463, filed on Apr. 1, 2012.

(30) Foreign Application Priority Data

Apr. 1, 2011  (CN) .......................... 2011 1 0081975

(51) Int. Cl.
H04N 9/74 (2006.01)

(52) U.S. Cl.
USPC ........... 348/581; 348/561; 348/586; 348/584; 345/660; 345/667; 345/666; 345/698; 345/699

(58) Field of Classification Search
USPC ................. 348/581, 561, 586, 584; 345/660, 345/666, 667, 698, 699
See application file for complete search history.

(56) References Cited

U.S. PATENT DOCUMENTS 6,310,601 B1 * 10/2001 Moore et al. .................. 345/660
6,982,729 B1    1/2006 Lange et al.

(Continued)

FOREIGN PATENT DOCUMENTS

CN  1808564 A  1/2006
CN  1808564 A  7/2006

(Continued)

OTHER PUBLICATIONS

Extended European Search Report issued in corresponding European Patent Application No. 12763222.2, mailed Apr. 29, 2013.

(Continued)

Primary Examiner — Jefferey Harold
Assistant Examiner — Mustafizur Rahman
(74) Attorney, Agent, or Firm — Brinks Hofer Gilson & Lione

(57) ABSTRACT

A method for displaying a video image includes acquiring foreground information about a video image to be output, where the foreground information includes information that defines a size of a foreground picture. The method further includes determining an adjustment coefficient for the foreground picture according to the size of the foreground picture, a size and a resolution of a display device, and a preset adjustment rule. The preset adjustment rule indicates that the product of the adjustment coefficient for the foreground picture and a zooming multiple for display on the display device is equal to a fixed constant. The method also includes adjusting the video image to be output according to the adjustment coefficient for the foreground picture, and outputting, to the display device for display, the video image after adjustment.

10 Claims, 4 Drawing Sheets

(56) References Cited

U.S. PATENT DOCUMENTS

| | | | |
|---|---|---|---|
| 7,450,132 B2 * | 11/2008 | Park et al. | 345/582 |
| 7,792,388 B2 * | 9/2010 | Akiyama | 382/284 |
| 8,279,937 B2 * | 10/2012 | Seo et al. | 375/240.24 |
| 8,441,524 B2 * | 5/2013 | Yahagi | 348/51 |
| 8,451,381 B2 * | 5/2013 | Kaise et al. | 348/607 |
| 2005/0174346 A1 * | 8/2005 | Park et al. | 345/422 |
| 2005/0206659 A1 | 9/2005 | Cutler | |
| 2005/0249433 A1 | 11/2005 | Ohbuchi | |
| 2006/0012616 A1 | 1/2006 | Paek | |
| 2009/0033682 A1 | 2/2009 | Kaida et al. | |

FOREIGN PATENT DOCUMENTS

| | | | |
|---|---|---|---|
| CN | 1858843 A | 11/2006 | |
| CN | 1946144 A | 4/2007 | |
| CN | 101156161 A | 4/2008 | |
| CN | 101166224 A | 4/2008 | |
| CN | 101360250 A | 2/2009 | |
| CN | 101399997 A | 4/2009 | |
| CN | 101630502 A | 1/2010 | |

OTHER PUBLICATIONS

Written Opinion of the International Searching Authority issued in corresponding PCT Application No. PCT/CN2012/073463 (including English Translation and verification of Translation); mailed Jul. 12, 2012.

International Search Report issued in corresponding PCT Application No. PCT/CN2012/073463; mailed Jul. 12, 2012.

"Series H: Audiovisual and Multimedia Systems Infrastructure of Audio visual Services—Systems and Terminal Equipment for Audiovisual Services—Packet Based Multimedia Communications Systems." International Telecommunication Union.—Telecommunication Standardization Sector of ITU. Dec. 2009.

International Search Report issued in corresponding PCT Patent Application No. PCT/CN2012/073463, mailed Jul. 12, 2012.

Written Opinion of the International Searching Authority issued in corresponding PCT Patent Application No. PCT/CN2012/073463, mailed Jul. 12, 2012.

ITU-T, "Packet-based Multimedia Communications Systems" Series H: Audiovisual and Multimedia Systems, Infrastructure of audiovisual services—Systems and terminal equipment for audiovisual services, H.323, Dec. 2009.

* cited by examiner

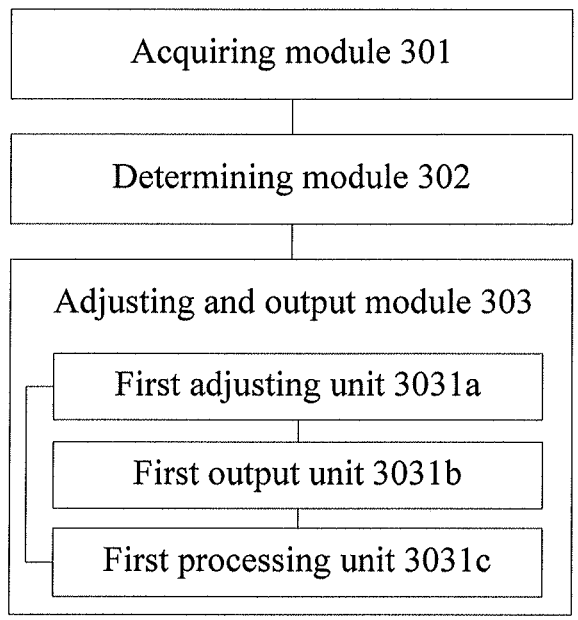
FIG. 4-a
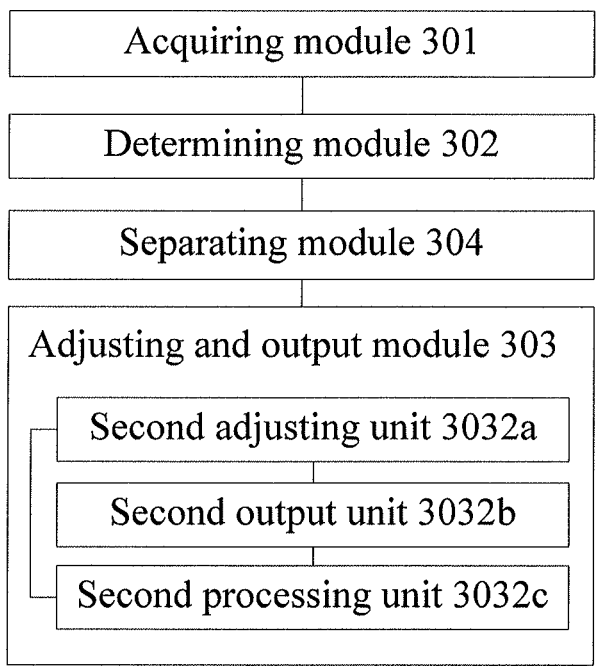
FIG. 4-b

METHOD AND APPARATUS FOR DISPLAYING VIDEO IMAGE

CROSS-REFERENCE TO RELATED APPLICATIONS

This application is a continuation of International Application No. PCT/CN2012/073463, filed on Apr. 1, 2012, which claims priority to Chinese Patent Application No. 201110081975.8, filed on Apr. 1, 2011, both of which are hereby incorporated by reference in their entireties.

FIELD OF TECHNOLOGY

The present application relates to the field of video display, and in particular to a method and an apparatus for displaying a video image.

BACKGROUND

With the development of coding and information compression technologies and digital networks, people have developed video display systems, which may transport information such as motion images, voice, and application data in real time between two or more points.

One basic function of a video display system is to collect and display video images. During the process of displaying a video, a device at a receiving end receives compressed video bit streams, decodes the compressed video bit streams to obtain a video image, and then outputs the video image to a display device for display. When the video image is displayed on the display device, a foreground picture in the video images, for example, a face area, may be zoomed in or out. The display device is usually installed by a user, so the sizes and resolutions of display devices at different conference sites may vary and foreground pictures may produce different zooming effects. For example, when the resolutions are the same, a foreground picture of the genuine size of a human appears the genuine size of a human on a 52-inch display device, providing genuine experience. If the foreground picture is presented on a 62-inch display device, the foreground picture may appear obviously zoomed in. If the video image is presented on a 42-inch display device, the foreground picture may appear obviously zoomed out.

To sum up, in an existing video display system, the foreground picture in a video image may be zoomed in or out to different degrees when being displayed on display devices with different sizes and resolutions, making it hard to present the image in a constant size. Therefore, a certain degree of distortion occurs.

SUMMARY

In order that a foreground picture in a video image can be presented in a constant size in a video display system, embodiments provide a method and an apparatus for displaying a video image. The technical solutions are as follows:

A method for displaying a video image is provided. The method includes: acquiring foreground information about a video image to be output, where the foreground information includes a size of a foreground picture; determining an adjustment coefficient for the foreground picture according to the size of the foreground picture, a size and a resolution of a display device, and a preset adjustment rule, where the preset adjustment rule is that the product of the adjustment coefficient for the foreground picture and a zooming multiple for display on the display device is equal to a fixed constant; and adjusting the video image to be output according to the adjustment coefficient for the foreground picture, and outputting, to the display device for display, the video image after adjustment.

An apparatus for displaying a video image is provided. The apparatus includes: an acquiring module, a determining module, and an adjusting and output module.

The acquiring module is configured to acquire foreground information about a video image to be output, where the foreground information includes a size of a foreground picture.

The determining module is configured to determine an adjustment coefficient for the foreground picture according to the size of the foreground picture, a size and a resolution of a display device, and a preset adjustment rule, where the preset adjustment rule is that the product of the adjustment coefficient for the foreground picture and a zooming multiple for display on the display device is equal to a fixed constant.

The adjusting and output module is configured to adjust the video image to be output according to the adjustment coefficient for the foreground picture, and output, to the display device for display, the video image after adjustment.

The benefits of the technical solutions provided in the embodiments are as follows:

Foreground information about a video image to be output is acquired. An adjustment coefficient for the foreground picture is determined according to the size of the foreground picture, a size and a resolution of a display device, and a preset adjustment rule that the product of the adjustment coefficient for the foreground picture and a zooming multiple for display on the display device is equal to a fixed constant. Then the video image to be output is adjusted according to the adjustment coefficient for the foreground picture, and is output to the display device for display after adjustment. In this way, a zoomed-in foreground picture is already zoomed out during adjustment before being displayed, and a zoomed-out foreground picture is already zoomed in during adjustment before being displayed. Therefore, the foreground picture can be presented in final display according to a constant size. Especially when the fixed constant is equal to 1, the foreground picture can be presented according to an original size, improving the fidelity of the foreground picture.

BRIEF DESCRIPTION OF THE DRAWINGS

To illustrate the technical solutions in the embodiments or in the prior art more clearly, the following briefly describes the accompanying drawings needed for describing the embodiments or the prior art. Apparently, the accompanying drawings in the following description show some embodiments, and persons skilled in the art may derive other drawings from these accompanying drawings without creative efforts.

FIG. 4-a is a schematic structural diagram of another apparatus for displaying a video image according to another embodiment; and FIG. 4-*b* is a schematic structural diagram of another apparatus for displaying a video image according to another embodiment.

DETAILED DESCRIPTION

To make the objectives, technical solutions, and advantages more comprehensible, the following describes the embodiments in further detail below with reference to the accompanying drawings.

Figure 1:
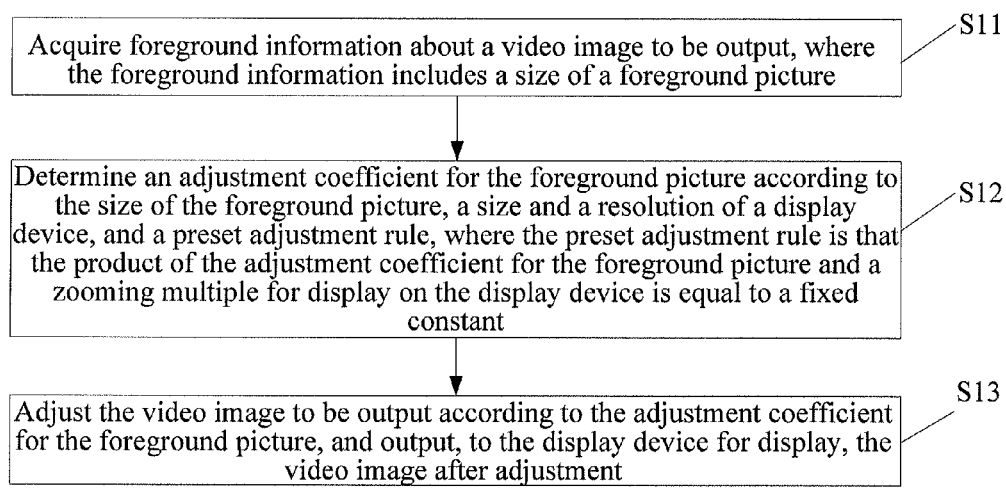
FIG. 1 is a flowchart of a method for displaying a video image according to an embodiment.

As shown in FIG. 1, an embodiment provides a method for displaying a video image. The method may be executed by a device at a receiving end. The method includes:

S11: Acquire foreground information about a video image to be output, where the foreground information includes a size of a foreground picture.

S12: Determine an adjustment coefficient for the foreground picture according to the size of the foreground picture, a size and a resolution of a display device, and a preset adjustment rule, where the preset adjustment rule is that the product of the adjustment coefficient for the foreground picture and a zooming multiple for display on the display device is equal to a fixed constant.

S13: Adjust the video image to be output according to the adjustment coefficient for the foreground picture, and output, to the display device for display, the video image after adjustment.

According to this embodiment, foreground information about a video image to be output is acquired. An adjustment coefficient for the foreground picture is determined according to the size of the foreground picture, a size and a resolution of a display device, and a preset adjustment rule that the product of the adjustment coefficient for the foreground picture and a zooming multiple for display on the display device is equal to a fixed constant. Then the video image to be output is adjusted according to the adjustment coefficient for the foreground picture, and after adjustment, is output to the display device for display. In this way, a zoomed-in foreground picture is already zoomed out during adjustment before being displayed, and a zoomed-out foreground picture is already zoomed in during adjustment before being displayed. Therefore, the foreground picture can be presented in final display according to a constant size. Especially when the fixed constant is equal to 1, the foreground picture can be presented according to an original size, improving the fidelity of the foreground picture.

Figure 2:
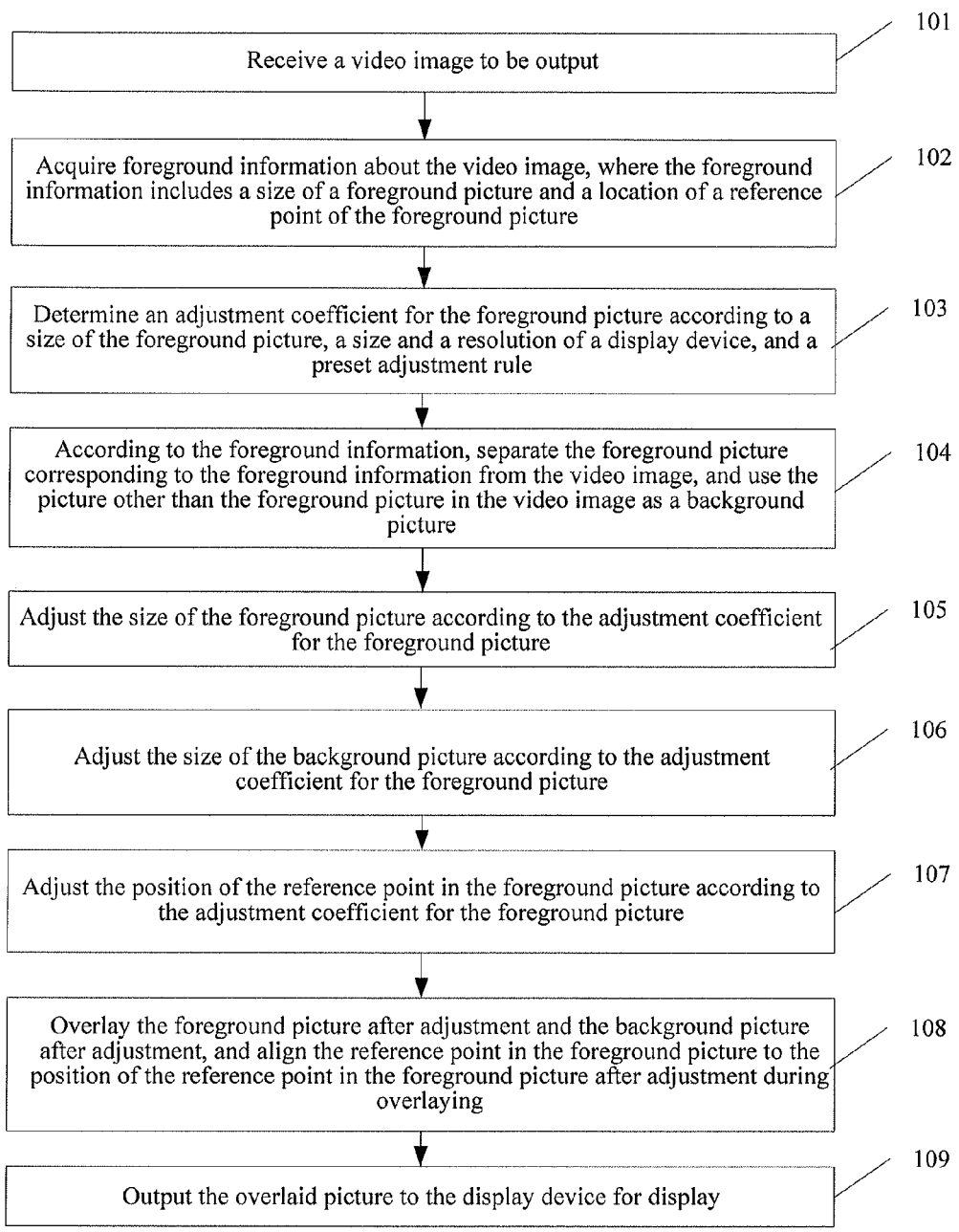
FIG. 2 is a flowchart of a method for displaying a video image according to another embodiment.

As shown in FIG. 2, another embodiment provides a method for displaying a video image. The method may be executed by a device at a receiving end. The method includes:

101: Receive a video image to be output.

According to this embodiment, it is assumed that the horizontal resolution and vertical resolution of the video image are W1 and H1 respectively.

102: Acquire foreground information about the video image, where the foreground information includes a size of a foreground picture and a position of a reference point in the foreground picture.

The foreground picture includes a face area or motion area. Specifically, two methods are available for acquiring the foreground information about the video image. The first method is that a sending end sends, to the receiving end, the bit streams of the video image together with the foreground information about the video image, so that the receiving end directly extracts, from the bit streams sent by the sending end, the foreground information about the video image. The second method is that the receiving end uses a foreground intelligent detection algorithm to detect the foreground picture and determines corresponding foreground information according to the foreground picture. The foreground intelligent detection algorithm may be a face area detection algorithm or motion area detection algorithm. Both algorithms belong to existing technologies and are not described here.

The size of the foreground picture includes width and height information. The reference point in the foreground picture may be any point in the foreground picture, for example, the climax at the left corner of the foreground picture.

The case that the foreground picture is a face area is taken as an example. According to this embodiment, it is assumed that the width of the face area is W_face and height is H_face, and it is assumed that the reference point in the face area is the climax at the left corner of the face area and the position of the climax at the left corner of the face area relative to the climax at the left corner of the video image includes left offset LeftOffset and top offset TopOffset.

103: Determine an adjustment coefficient for the foreground picture according to a size of the foreground picture, a size and a resolution of a display device, and a preset adjustment rule.

The preset adjustment rule is that the product of the adjustment coefficient for the foreground picture and a zooming multiple for display on the display device is equal to a fixed constant. That is, if the foreground picture is zoomed in for display on a display corresponding to the size and resolution, the size of the foreground picture is zoomed out; if the foreground picture is zoomed out for display on a display corresponding to the size and resolution, the size of the foreground picture is zoomed in. When the fixed constant is equal to 1, the foreground picture after adjustment may be displayed according to the original size on different display devices; when the fixed constant is a value other than 1, the foreground picture after adjustment may be displayed according to a constant size on different display devices.

The adjustment coefficient for the foreground picture includes: an adjustment coefficient for the width of the foreground picture and an adjustment coefficient for the height of the foreground picture, where both coefficients may be the same or different.

104: According to the foreground information, separate the foreground picture corresponding to the foreground information from the video image, and use the picture other than the foreground picture in the video image as a background picture.

105: Adjust the size of the foreground picture according to the adjustment coefficient for the foreground picture.

Here, size of the foreground picture after adjustment=size the foreground picture before adjustment×adjustment coefficient for the foreground picture.

If the foreground picture is a face area, when the display size of the face area, and the size and resolution of the display device are known, the adjustment coefficient for the foreground picture may be determined according to the preset adjustment rule so that the size of the face area after adjustment is determined. In specific implementation, to save the calculation time during adjustment, a table of the adjustment relationship between the size and resolution of the display device and the size of the face area after adjustment may be preset. During adjustment to the size of the foreground picture, the table of the adjustment relationship may be queried to directly determine the size of the foreground picture corresponding to the size and resolution of a display device.

For example, Table 1 is an example of the table of the adjustment relationship. If the size of a display device is 52 inches, and the resolution of the display device is 1280×720, for a face area with a size of W_face and H_face, the width and height corresponding to the size of the face area after adjustment are Face_W11 and Face_H11 respectively.

TABLE 1

| Display Device Size | Display Device Resolution | Size of Face Area After Adjustment (Width/Height) |
|---|---|---|
| 42 inches | 1920 × 1080 | Face_W00, Face_H00 |
|  | 1280 × 720 | Face_W01, Face_H01 |
|  | 720 × 576 | Face_W02, Face_H02 |
| 52 inches | 1920 × 1080 | Face_W10, Face_H10 |
|  | 1280 × 720 | Face_W11, Face_H11 |
|  | 720 × 576 | Face_W12, Face_H12 |
| 65 inches | 1920 × 1080 | Face_W20, Face_H20 |
|  | 1280 × 720 | Face_W21, Face_H21 |
|  | 720 × 576 | Face_W22, Face_H22 |

106: Adjust the size of the foreground picture according to the adjustment coefficient for the foreground picture.

Specifically, size of the background image after adjustment=size the background image before adjustment×adjustment coefficient for the background image. The preceding takes the case that the foreground picture is a face area as an example.

Adjustment coefficient for the width of the face area Scale_W=Face_W11/W_face;

Adjustment coefficient for the height of the face area Scale_H=Face_H11/H_face;

Then,

Width of the background picture after adjustment W2=W1×Scale_W;

Height of the background picture after adjustment H2=H1×Scale_H.

Further, the background picture after adjustment is processed so that the size of the background picture after adjustment is equal to the product of the size of the background picture before adjustment and a fixed constant. Specifically, if the size of the background picture after adjustment is larger than the product of the size of the background picture before adjustment and the fixed constant, the background picture after adjustment is cut so that the size of the background picture after adjustment is equal to the product of the size of the background picture before adjustment and the fixed constant. If the size of the background picture after adjustment is equal to the product of the size of the background picture before adjustment and the fixed constant, no processing is performed. If the size of the background picture after adjustment is smaller than the product of the size of the background picture before adjustment and the fixed constant, the background picture after adjustment is filled so that the size of the background picture after adjustment is equal to the product of the size of the background picture before adjustment and the fixed constant. This embodiment does not restrict a filling method. For example, the filling method may be filling through extension to the left or right, filling through mirroring on the left or right, single color filling, background picture filling, and so on.

For example, when the fixed constant is equal to 1, the width of the background picture after adjustment is processed. If W2>W1, a background picture whose width is W1 may be cut from the background picture whose width is W2. If W2=W1, no processing is performed. If W2<W1, the background picture whose width is W2 may be filled so that the width of the background picture turns into W1. The process of handling the height of the background picture is the same as that of handling the width, and is not described here.

107: Adjust the position of the reference point in the foreground picture according to the adjustment coefficient for the foreground picture.

Specifically, position of the reference point in the foreground picture after adjustment=position of the reference point in the foreground picture before adjustment×adjustment coefficient for the foreground picture. The preceding takes the case that the foreground picture is a face area as an example.

Adjustment coefficient for the width of the face area Scale_W=Face_W11/W_face;

Adjustment coefficient for the height of the face area Scale_H=Face_H11/H_face;

Then,

Left offset of the climax at the left corner of the face area after adjustment LeftOffset2=LeftOffset×Scale_W;

Upper offset of the climax at the left corner of the face area after adjustment TopOffset2=TopOffset×Scale_H.

108: Overlay the foreground picture after adjustment and the background picture after adjustment, and align the reference point in the foreground picture to the position of the reference point in the foreground picture after adjustment during overlaying.

109: Output an overlaid picture to the display device for display.

Specifically, according to the preset adjustment rule, the product of the adjustment coefficient for the foreground picture and a zooming multiple for display on the display device is equal to a fixed constant. Therefore, if the overlaid picture is zoomed in when being displayed on the display device, the foreground picture may be zoomed out during adjustment. In this way, the foreground picture can be presented in a final display result according to a constant size. Especially, when the fixed constant is equal to 1, the foreground picture can be presented in the final display result according to the original size. On the contrary, if the overlaid picture is zoomed out when being displayed on the display device, the foreground picture may be zoomed in during adjustment. In this way, the foreground picture can be presented in the final display result according to the constant size. Especially, when the fixed constant is equal to 1, the foreground picture can be presented in the final display result according to the original size.

Further, the video image to be output is a specified picture. The specified picture may be specified manually, specified at a fixed time point, or specified by the sending end through an instruction. Adjustment parameters are determined by specifying the picture. Adjustment parameters include the adjustment coefficient for the foreground picture, and parameters regarding the cutting/filling position in the background. The size of each frame of video image subsequently received by the receiving end is adjusted according to the adjustment parameters of the specified picture, and overlaid, and the overlaid picture is output to the display device for display.

According to this embodiment, foreground information about a video image to be output is acquired. An adjustment coefficient for the foreground picture is determined according to the size of the foreground picture, a size and a resolution of a display device, and a preset adjustment rule that the product of the adjustment coefficient for the foreground picture and a zooming multiple for display on the display device is equal to a fixed constant. The foreground picture, background picture, and position of a reference point in the foreground picture are adjusted respectively according to the adjustment coefficient. The foreground picture after adjustment is overlaid with the background picture after adjustment according to the position of the reference point after adjustment before being output to the display device for display. In this way, a zoomed-in foreground picture is already zoomed out during adjustment before being displayed, and a zoomed-out foreground picture is already zoomed in during adjustment before being displayed. Therefore, the foreground picture can be presented in final display according to a constant size. Especially when the fixed constant is equal to 1, the foreground picture can be presented according to the original size, improving the fidelity of the foreground picture.

Figure 3:
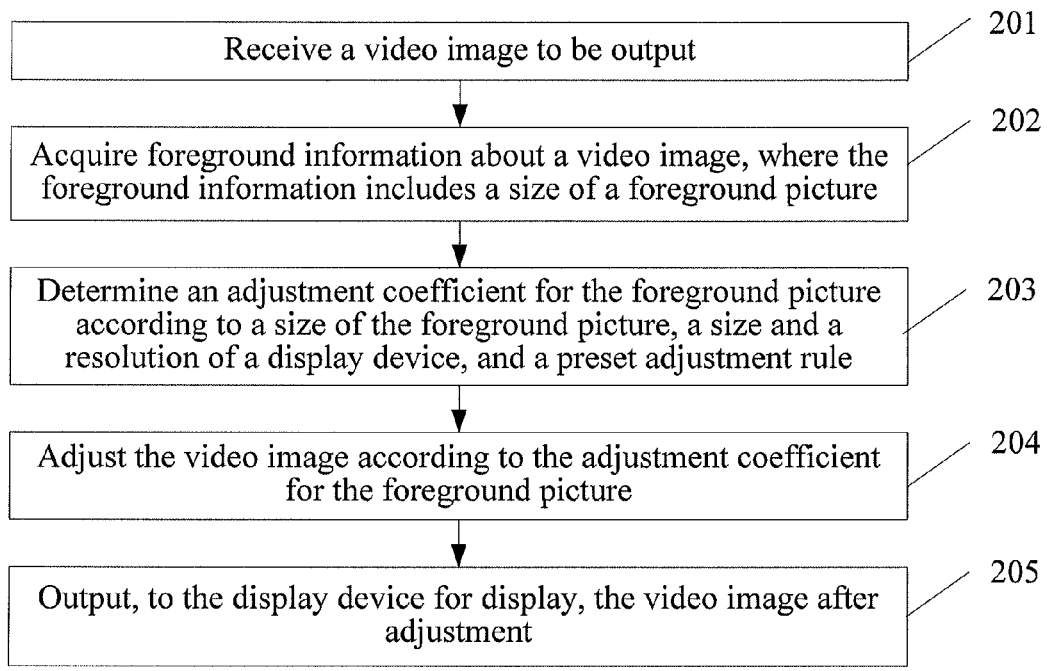
FIG. 3 is a flowchart of a method for displaying a video image according to another embodiment.

As shown in FIG. 3, another embodiment provides a method for displaying a video image. The method may be executed by a device at a receiving end. The method includes:

201. Receive a video image to be output.

This step is the same as step 101 and is not described here.

202. Acquire foreground information about a video image, where the foreground information includes a size of a foreground picture.

The method for acquiring the foreground information in this step is the same as that in step 102, and is not described here. The content of the foreground information in this step is different from the content of the foreground information in step 102.

203. Determine an adjustment coefficient for the foreground picture according to a size of the foreground picture, a size and a resolution of a display device, and a preset adjustment rule.

This step is the same as step 103 and is not described here.

204. Adjust the video image according to the adjustment coefficient for the foreground picture.

Specifically, size of the video image after adjustment=size the video image before adjustment×adjustment coefficient for the foreground picture.

Further, the video image after adjustment is processed so that the size of the video image after adjustment is equal to the product of the size of the video image before adjustment (that is, the video image to be output) and a fixed constant. Specifically, if the size of the video image after adjustment is larger than the product of the size of the video image before adjustment and the fixed constant, the video image after adjustment is cut so that the size of the video image after adjustment is equal to the product of the size of the video image before adjustment and the fixed constant. If the size of the video image after adjustment is equal to the product of the size of the video image before adjustment and the fixed constant, no processing is performed. If the size of the video image after adjustment is smaller than the product of the size of the video image before adjustment and the fixed constant, the video image after adjustment is filled so that the size of the video image after adjustment is equal to the product of the size of the video image before adjustment and the fixed constant. This embodiment does not restrict a filling method. For example, the filling method may be filling through extension to the left or right, filling through mirroring on the left or right, single color filling, video image filling, and so on.

205. Output, to the display device for display, the video image after adjustment.

Specifically, according to the preset adjustment rule, the product of the adjustment coefficient for the foreground picture and a zooming multiple for display on the display device is equal to a fixed constant. Therefore, if the video image after adjustment is zoomed in when being displayed on the display device, the foreground picture may be zoomed out during adjustment. In this way, the foreground picture can be presented in the final display result according to a constant size. Especially, when the fixed constant is equal to 1, the foreground picture can be presented in the final display result according to the original size. On the contrary, if the video image after adjustment is zoomed out when being displayed on the display device, the foreground picture may be zoomed in during adjustment. In this way, the foreground picture can be presented in the final display result according to the constant size. Especially, when the fixed constant is equal to 1, the foreground picture can be presented in the final display result according to the original size.

Further, the video image to be output is a specified picture. The specified picture may be specified manually, specified at a fixed time point, or specified by the sending end through an instruction. Adjustment parameters are determined by specifying the picture. Adjustment parameters include the adjustment coefficient for the foreground picture, and parameters regarding the cutting/filling position in the video image. The size of each frame of video image subsequently received by the receiving end is adjusted according to the adjustment parameters of the specified picture, and output to the display device for display.

According to this embodiment, foreground information about a video image to be output is acquired. An adjustment coefficient for the foreground picture is determined according to the size of the foreground picture, a size and a resolution of a display device, and a preset adjustment rule that the product of the adjustment coefficient for the foreground picture and a zooming multiple for display on the display device is equal to a fixed constant. Then the video image to be output is adjusted according to the adjustment coefficient for the foreground picture, and is output after adjustment to the display device for display. In this way, a zoomed-in foreground picture is already zoomed out during adjustment before being displayed, and a zoomed-out foreground picture is already zoomed in during adjustment before being displayed. Therefore, the foreground picture can be presented in final display according to the original size. Especially when the fixed constant is equal to 1, the foreground picture can be presented according to the original size, improving the fidelity of the foreground picture.

Figure 4:
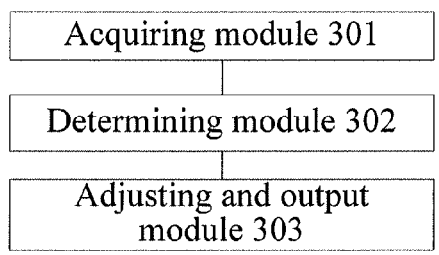
FIG. 4 is a schematic structural diagram of an apparatus for displaying a video image according to another embodiment.

As shown in FIG. 4, another embodiment provides an apparatus for displaying a video image. The apparatus may be a device at a receiving end. The apparatus includes: an acquiring module 301, a determining module 302, and an adjusting and output module 303.

The acquiring module 301 is configured to acquire foreground information about a video image to be output, where the foreground information includes a size of a foreground picture.

The determining module 302 is configured to determine an adjustment coefficient for the foreground picture according to the size of the foreground picture, a size and a resolution of a display device, and a preset adjustment rule, where the preset adjustment rule is that the product of the adjustment coefficient for the foreground picture and a zooming multiple for display on the display device is equal to a fixed constant.

The adjusting and output module 303 is configured to adjust the video image to be output according to the adjustment coefficient for the foreground picture, and output, to the display device for display, the video image after adjustment.

1) When the entire video image is adjusted, as shown in FIG. 4-a:

The adjusting and output module 303 includes: a first adjusting unit 3031a and a first output unit 3031b, and may further include a first processing unit 3031c.

The first adjusting unit 3031a is configured to adjust the video image to be output according to the adjustment coefficient for the foreground picture.

The first output unit 3031b is configured to output, to the display device for display, the video image after adjustment.

The first processing unit 3031c is configured to: before executing the function of the first output unit 3031b, cut or fill the video image after adjustment, so that the size of the video image after adjustment is equal to the product of the size of the video image to be output and a fixed constant.

2) When the video image is separated into the foreground picture and background picture and adjusted separately, as shown in FIG. 4-b:

In this case, the foreground information further includes a position of a reference point in the foreground picture.

Accordingly, the apparatus further includes: a separating module 304, configured to: before executing the function of the adjusting and output module 303, separate the foreground picture corresponding to the foreground information from the video image to be output and use the picture other than the foreground picture in the video image to be output as the background picture.

Accordingly, the adjusting and output module 303 includes: a second adjusting unit 3032a and a second output unit 3032b, and may further include a second processing unit 3032c.

The second adjusting unit 3032a is configured to adjust a size of the foreground picture, a size of the background picture, and a position of a reference point in the foreground picture respectively according to the adjustment coefficient for the foreground picture, overlay the foreground picture after adjustment and the background picture after adjustment, and align the reference point in the foreground picture to the position of the reference point in the foreground picture after adjustment during overlaying.

The second output unit 3032b is configured to output the video image after adjustment to the display device for display.

The second processing unit 3032c is configured to cut or fill the background picture after adjustment before executing the function of the second output unit 3032b so that the size of the background picture after adjustment is equal to the product of the size of the background picture and a fixed constant.

According to this embodiment, foreground information about a video image to be output is acquired. An adjustment coefficient for the foreground picture is determined according to the size of the foreground picture, a size and a resolution of a display device, and a preset adjustment rule that the product of the adjustment coefficient for the foreground picture and a zooming multiple for display on the display device is equal to a fixed constant. Then the video image to be output is adjusted according to the adjustment coefficient for the foreground picture, and is output after adjustment to the display device for display. In this way, a zoomed-in foreground picture is already zoomed out during adjustment before being displayed, and a zoomed-out foreground picture is already zoomed in during adjustment before being displayed. Therefore, the foreground picture can be presented in final display according to the original size. Especially when the fixed constant is equal to 1, the foreground picture can be presented according to the original size, improving the fidelity of the foreground picture.

All or part of the contents in the technical solution provided in the foregoing embodiments may be implemented by software programs, and the software programs are stored in readable storage media such as a computer hard disk, an optical disk, or a floppy disk.

The foregoing describes only exemplary embodiments and is not intended to limit the scope of the claims. Modifications, equivalent replacements, and/or improvements may be made to these embodiments without departing the spirit and principle of the claims.

What is claimed is:

1. A method for displaying a video image, comprising:
    acquiring foreground information related to a video image to be output, wherein the foreground information comprises information that defines a size of a foreground picture;
    determining an adjustment coefficient for the foreground picture according to the size of the foreground picture, a size and a resolution of a display device, and a preset adjustment rule, wherein the preset adjustment rule indicates that the product of the adjustment coefficient for the foreground picture and a zooming multiple for display on the display device is equal to a fixed constant;
    adjusting the video image to be output according to the adjustment coefficient for the foreground picture; and
    subsequently outputting the video image to the display device for display.

2. The method according to claim 1, wherein before outputting the video image to the display device, the method further comprises:
    cutting or filling the video image so that a size of the video image after adjustment is equal to a product of a size of the video image to be output and the fixed constant.

3. The method according to claim 1, wherein the foreground information further comprises information that defines a position of a reference point in the foreground picture; and
    before adjusting the video image according to the adjustment coefficient for the foreground picture, the method further comprises:
    separating the foreground picture corresponding to the foreground information from the video image to be output and using a picture other than the foreground picture in the video image to be output as a background picture.

4. The method according to claim 3, wherein adjusting the video image to be output according to the adjustment coefficient for the foreground picture comprises:
    adjusting a size of the foreground picture, a size of the background picture, and the position of the reference point in the foreground picture, respectively, according to the adjustment coefficient for the foreground picture; and
    overlaying the foreground picture after adjustment and the background picture after adjustment, and
    aligning the reference point in the foreground picture to the position of the reference point in the foreground picture after adjustment during overlaying.

5. The method according to claim 4, wherein before outputting the video image to the display device, the method further comprises:
    cutting or filling the background picture after adjustment so that the size of the background picture after adjustment is equal to a product of the size of the background picture before adjustment and the fixed constant.

6. An apparatus for displaying a video image comprising:
    an acquiring module configured to acquire foreground information about a video image to be output, wherein the foreground information comprises information that defines a size of a foreground picture;
    a determining module configured to determine an adjustment coefficient for the foreground picture according to the size of the foreground picture, a size and a resolution of a display device, and a preset adjustment rule, wherein the preset adjustment rule indicates that the product of the adjustment coefficient for the foreground picture and a zooming multiple for display on the display device is equal to a fixed constant; and an adjusting and output module configured to adjust the video image to be output according to the adjustment coefficient for the foreground picture, and output, to the display device for display, the video image after adjustment.

7. The apparatus according to claim 6, wherein the adjusting and output module comprises:
a first adjusting unit is configured to adjust the video image to be output according to the adjustment coefficient for the foreground picture;
a first output unit is configured to output, to a display device for display, the video image after adjustment; and
a first processing unit is configured to cut or fill the video image after adjustment before executing a function of the first output unit so that the size of the video image after adjustment is equal to the product of the size of the video image to be output and the fixed constant.

8. The apparatus according to claim 6, wherein the foreground information further comprises a position of a reference point in the foreground picture;
wherein the apparatus further comprises:
a separating module configured to: separate the foreground picture corresponding to the foreground information from the video image to be output and use a picture other than the foreground picture in the video image to be output as a background picture before executing a function of the adjusting and output module.

9. The apparatus according to claim 8, wherein the adjusting and output module comprises:
a second adjusting unit configured to adjust a size of the foreground picture, a size of the background picture, and the position of the reference point in the foreground picture, respectively, according to the adjustment coefficient for the foreground picture, overlay the foreground picture after adjustment and the background picture after adjustment, and align the reference point in the foreground picture to the position of the reference point in the foreground picture after adjustment during overlaying; and
a second output unit configured to output, to a display device for display, the video image after adjustment.

10. The apparatus according to claim 9, wherein the adjusting and output module further comprises: a second processing unit, configured to:
cut or fill the background picture after adjustment before executing a function of the second output unit, so that the size of the background picture is equal to a product of the size of the background picture and the fixed constant after adjustment.

* * * * *